United States Patent [19]

Lang

[11] Patent Number: 4,770,768

[45] Date of Patent: Sep. 13, 1988

[54] WATER FILTER APPARATUS AND AERATOR ASSEMBLY

[75] Inventor: Kenneth Lang, Loveland, Colo.

[73] Assignee: Teledyne Industries, Inc., Fort Collins, Colo.

[21] Appl. No.: 928,920

[22] Filed: Nov. 10, 1986

Related U.S. Application Data

[62] Division of Ser. No. 716,811, Mar. 27, 1985, Pat. No. 4,686,037.

[51] Int. Cl.$^4$ ............................................ B01D 27/08
[52] U.S. Cl. ...................................... 210/94; 210/232; 210/282; 210/422; 210/424; 210/502.1; 261/DIG. 22; 239/428.5
[58] Field of Search ............... 210/232, 238, 281, 282, 210/422, 424, 456, 502.1, 95, 94; 261/DIG. 22, DIG. 39; 239/428.5, 397; 285/8, 12

[56] References Cited

U.S. PATENT DOCUMENTS

| | | | |
|---|---|---|---|
| 2,721,089 | 10/1955 | Shames | 285/8 |
| 2,774,584 | 12/1956 | Aghnides | 261/DIG. 22 |
| 3,540,594 | 11/1970 | Sanderson | 210/282 |
| 3,827,636 | 8/1974 | Parkison | 261/DIG. 22 |
| 4,107,046 | 8/1978 | Corder | 210/282 |
| 4,147,631 | 4/1979 | Deines et al. | 210/282 |
| 4,151,092 | 4/1979 | Grimm et al. | 210/282 |
| 4,172,796 | 10/1979 | Corder | 210/282 |
| 4,212,743 | 7/1980 | Van Meter et al. | 210/282 |
| 4,271,015 | 6/1981 | Moore | 210/94 |
| 4,504,389 | 3/1985 | Rundzaitis | 210/424 |
| 4,591,438 | 5/1986 | Tanabe et al. | 210/282 |

Primary Examiner—Benoit Castel
Assistant Examiner—Richard D. Jordan
Attorney, Agent, or Firm—Hugh H. Drake

[57] ABSTRACT

A water filter has an elongated base with an inlet opening near one end thereof to which is secured an adaptor ring for attachment to a water faucet. A first outlet opening on the base dispenses unfiltered water and there is a channel defined within the base that leads toward the other end, with an externally-operable valve being included for selecting between unfiltered flow to that outlet and flow down the channel. Located near the other end of the base is a mounting on which sits a water filter cartridge that communicates with the channel, and the cartridge delivers filtered water to a second outlet. A number of features include a color indicator to exhibit degree of cartridge usage, a reversible adaptor ring to accommodate different faucets and there are different aerator structures. Of particular note is the replaceable cartridge which includes a deflector for obtaining better usage of the main filtering material, an exteriorally-mounted first filter and an internally-mounted second filter.

7 Claims, 4 Drawing Sheets

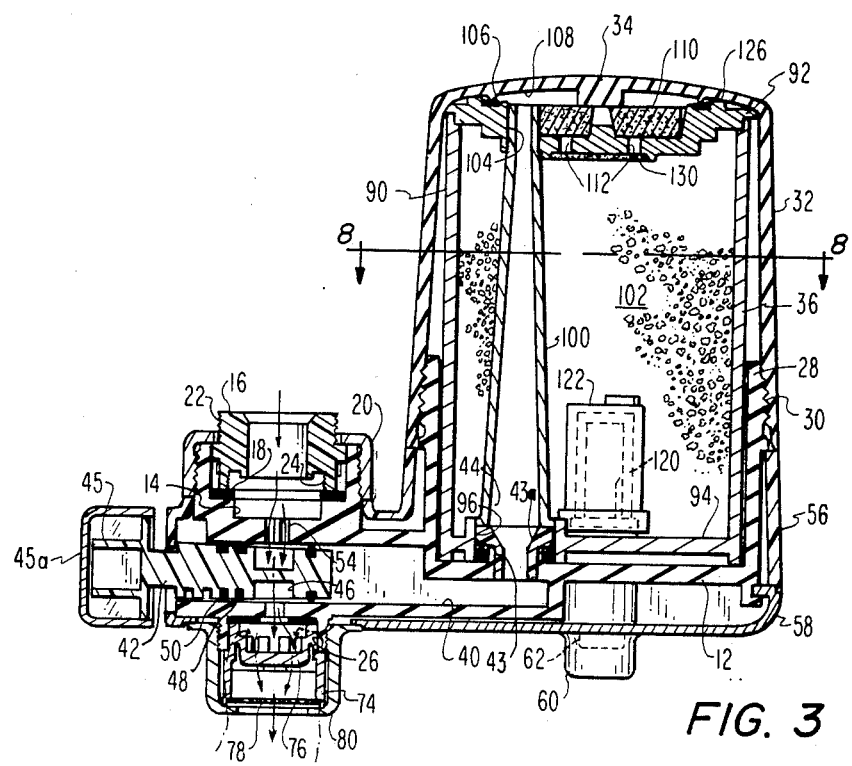
FIG. 3
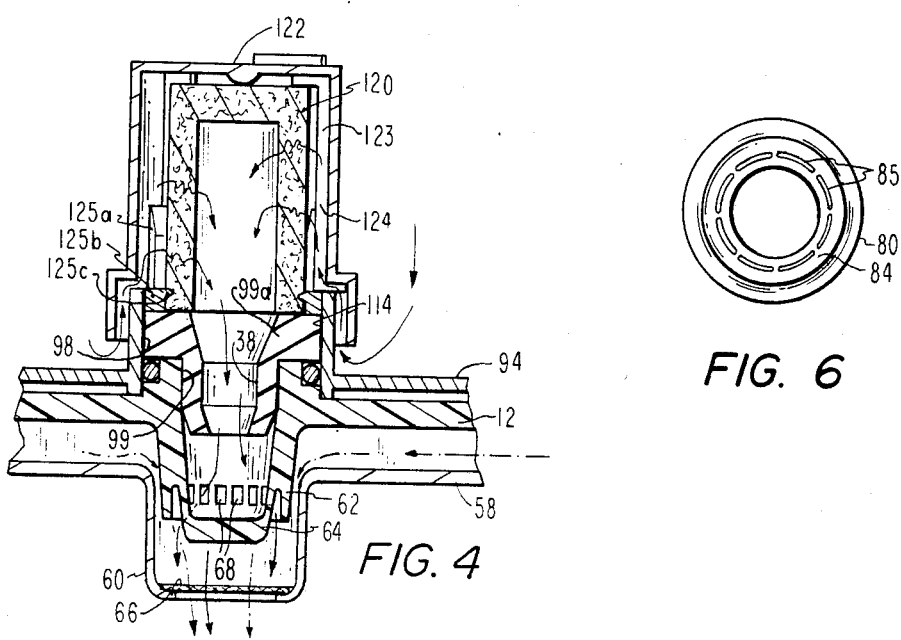
FIG. 4
FIG. 6

WATER FILTER APPARATUS AND AERATOR ASSEMBLY

This is a division of parent application Ser. No. 716,811, now U.S. Pat. No. 4,686,037, filed Mar. 27, 1985 and assigned to the same assignee as the present application.

The present invention relates to water filter apparatus. More particularly, it pertains to a faucet-attachment water filter assembly together with a replaceable cartridge for filtering water flow.

Water filters, of course, have taken a wide variety of different forms, ranging between industrial units and individual units for use in the home. In the latter field of utility, those, in turn, have involved units that might mount under the kitchen sink, sit on a counter top or be attached to a faucet at the kitchen sink or elsewhere. The units intended primarily for home usage almost always feature a replaceable filter-cartridge. Representative of such prior filter cartridges are those described in prior U.S. Pat. Nos. 4,107,046, 4,147,631, 4,151,092 and 4,172,796, all assigned to applicant's assignee. As will be seen by reference to the numerous prior patents cited against the applications on which those patents matured, the art has been evolving for a long time.

Faucet-attachment types of water filters have become a viable commercial product, possibly by reasan of the fact that they do not require changes in plumbing to allow their use in the home or similar environment. Typically, they attach to the outlet of a faucet in the kitchen sink and include valving to permit flow of either unfiltered or filtered water, the water to be filtered flowing through a replaceable cartridge mounted upon one portion of the appliance.

Such water filters usually employ an aerator on either or both of the unfiltered and filtered water outlets, and a means of attachment to the end of the water faucet. A cap contains the replaceable cartridge. The usual cartridge includes activated charcoal particles and there often are included a prefilter for entrapping large particulates and a postfilter for also entrapping carbon fines.

Nevertheless, prior apparatus and filter mechanisms have not been as efficient as they might be, and they also have not led to efficiencies in manufacture. These deficiencies have been somewhat difficult to overcome because it is always desirable to have a given filter cartridge be adaptable to a multiplicity of different usages, such as may be observed by reference to the variety of apparatus in the above-referenced patents.

Accordingly, it is a very general object of the present invention to provide both a better faucet-attachment kind of water filter appliance and also to provide a new and improved replaceable filter cartridge for not only that appliance but also useful in others.

Another object of the present invention is to provide a new and improved filter cartridge which better enables use of the basic filtration material.

A further object of the present invention is to provide both improved prefilters and postfilters disposed about the main filtration material.

Still another object of the present invention is to provide a new and improved water filter cartridge that can work with equipment previously designed for older cartridges.

A particular object of the present invention, whether related to the filter cartridge itself or to the overall assembly as adapted specifically to a water filter kind of unit that attaches to a faucet, is to improve and simplify manufacturing approaches.

In accordance with one aspect of the present invention, a water filter cartridge has a shell which combines filtration material through which the water flows, the shell having opposite end walls. A conduit is disposed through the material from a first opening in one of the end walls to a second opening in the other of the end walls. A third opening in one of the end walls is spaced from one of the first and second openings and communicates with the material. A fourth opening in the other of the end walls is spaced from the other of the first and second openings and also communicates with the material at a location spaced from the third opening. A first water filtration element is disposed in the path of the water flow through the third opening in communication with the material, while a second water filtration element is disposed in the path of water flowing in communication with the material through the fourth opening. Further included are one or more such features as a deflector which surrounds the second filtration element in order to force the water flow to spread laterally through the material, the disposition of the first water filtration element on the exterior of one end of the wall in covering relationship to the third opening and the use of a second water filter element cylindrical in shape and in communication with the material.

In another aspect of the invention, there is a faucet-attachment water filter which includes an elongated base having an inlet opening and a somewhat opposite outlet opening near one end thereof together with means for mounting a replaceable cartridge at the other end thereof which cooperates with another outlet in that portion of the overall assembly. An adaptor ring, which may be reversible, is secured to the inlet opening. Effectively two-piece aerators, in which the aerator distributor is formed of a single molded piece to accomplish all of the primary functions of aeration, are employed for either or both of the filtered and unfiltered water flow.

The features of the present invention which are believed to be patentable are set forth with particularity in the appended claims. The organization and manner of operation of the invention, together with further objects and advantages thereof, may best be understood by reference to the following description of one or more specific embodiments thereof taken in connection with the accompanying drawings, in the several figures of which like reference numerals identify like elements and in which:

FIG. 3 is a view similar to FIG. 2 but with certain valve components in a different position;

FIG. 4 is an enlarged central cross-sectional view of the region indicated by the line 4—4 in FIG. 8;

FIG. 6 is a bottom plan view of an aerator retainer shown in others of the figures;

Figures 1, 2:
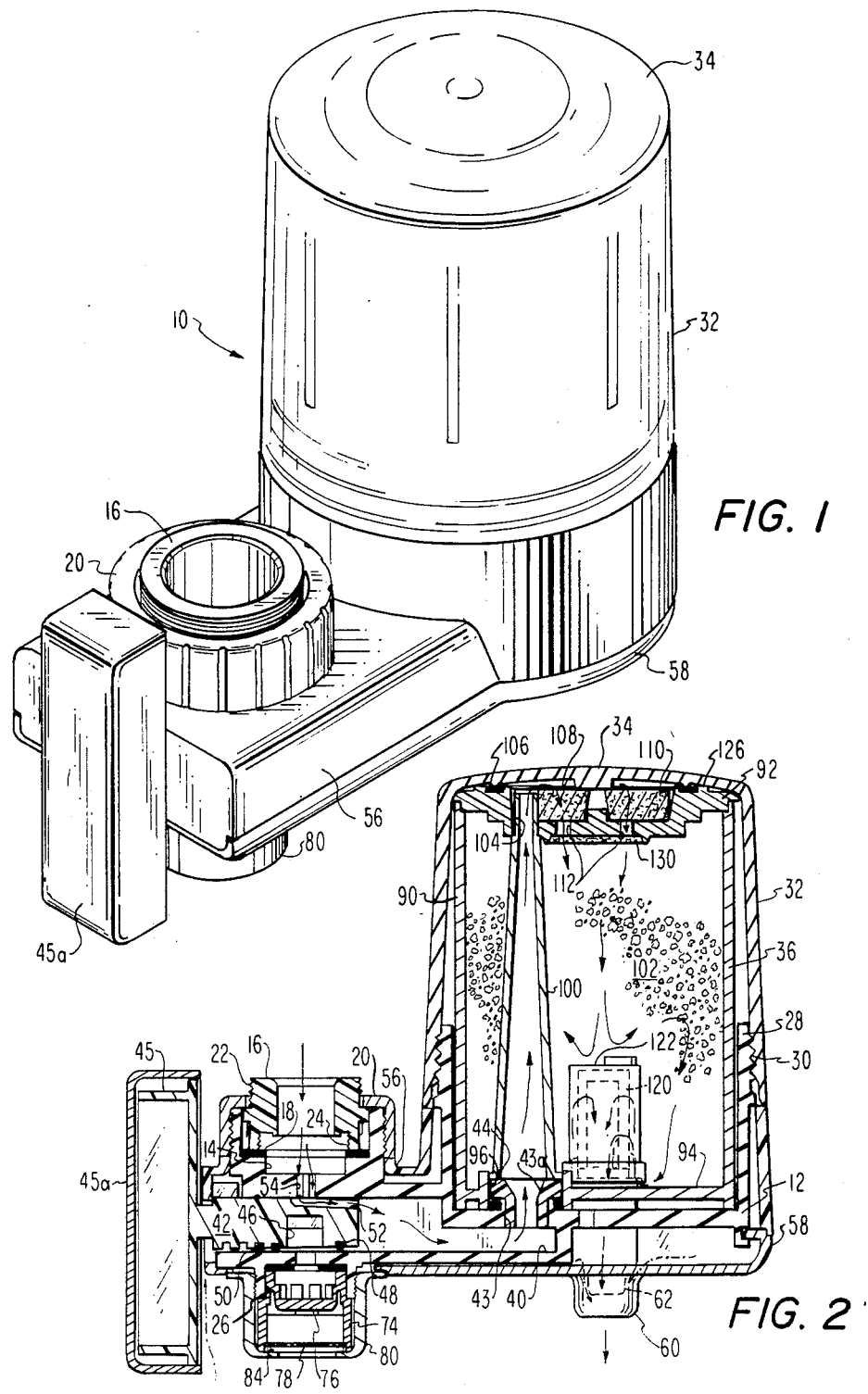
FIG. 1 is an isometric view of a water-filter apparatus.
FIG. 2 is a longitudinal cross-sectional view of the apparatus of FIG. 1.
Figure 5:
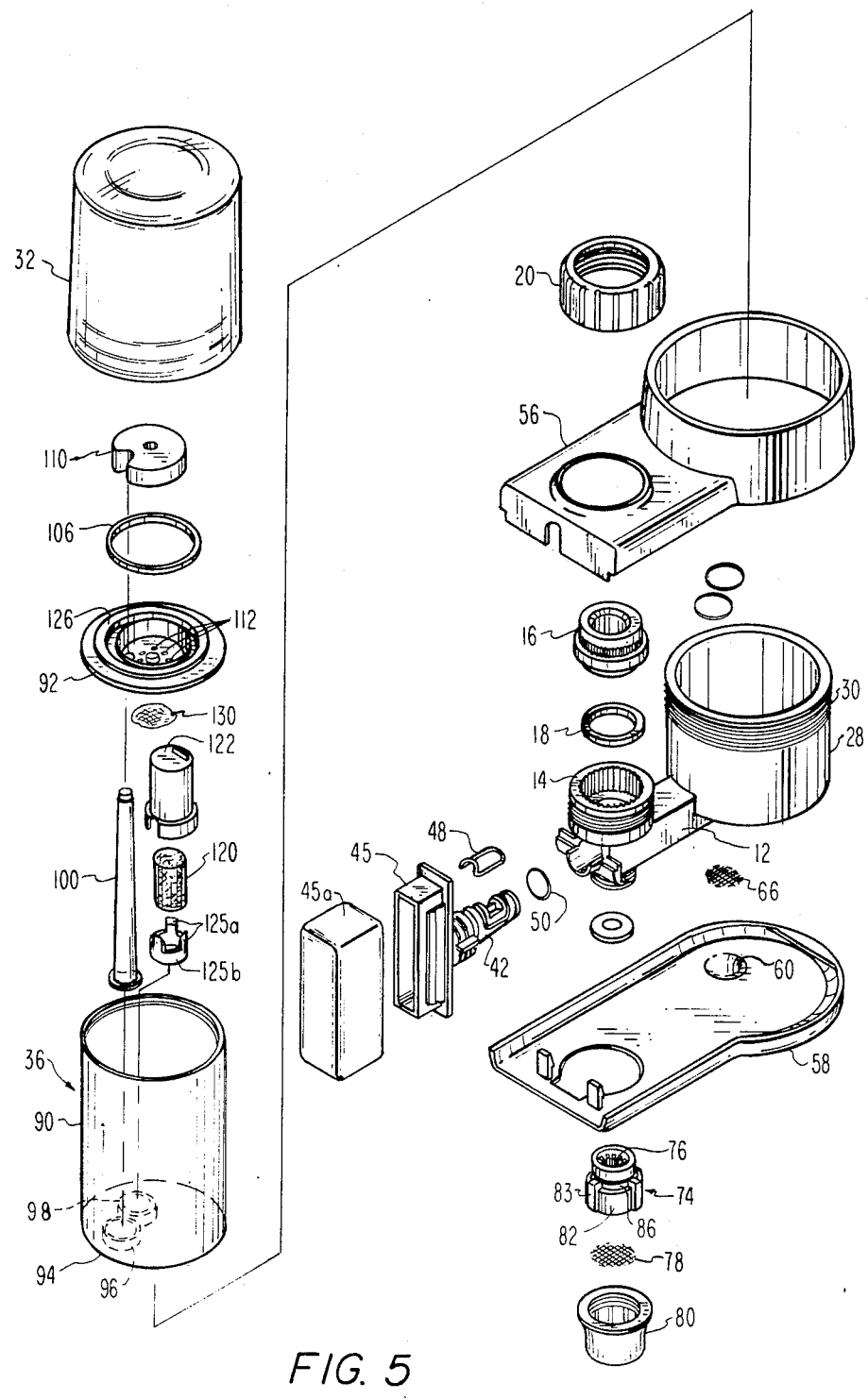
FIG. 5 is an exploded isometric view of the apparatus shown in FIG. 1.
Figure 7:
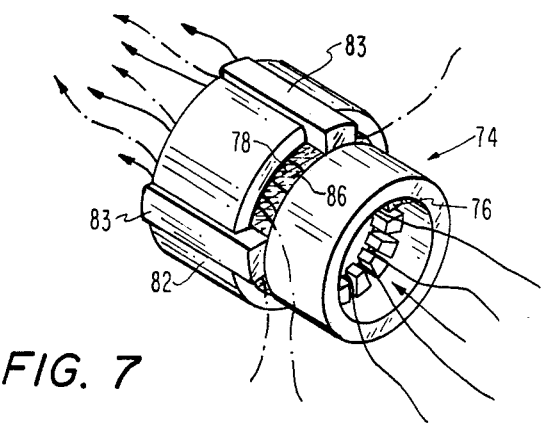
FIG. 7 is an isometric view of an aerator component shown in others of the figures.
Figure 8:
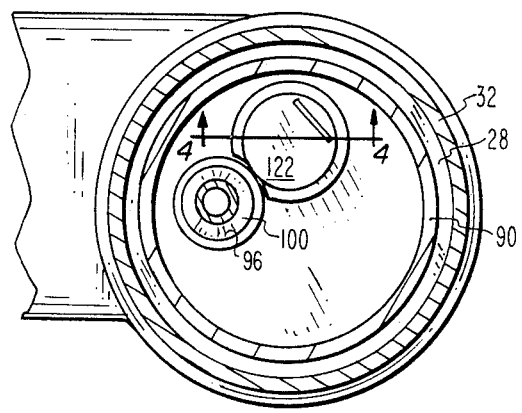
FIG. 8 is a fragmentary top plan view taken along the line 8—8 in FIG. 3.

A water filter 10 has an elongated, somewhat platform-shaped, base 12 with an inlet opening 14 near one end thereof. An adaptor ring 16 is secured to opening 14 by seating upon an elastomeric washer 18 and held in place by a collar 20 threaded into place.

Adaptor 16 has exteriorally-facing threads at 22 around one end portion and is internally threaded at 24 near its other end portion. As shown in FIG. 2, adaptor 22 is intended to be mateable with standard internal threads on many conventional sink faucets. When reversed, so that interiorally-facing internal threads 24 are disposed in an upright position, those threads are intended to mate with a standard external thread which exist on a large numbar of other sink faucets. Accordingly in this instance, internal threads 24 are 55/64-27 UNS, while external threads 22 are 15/16-27 UNS.

Opposite inlet opening 14 is an outlet opening 26. Near the other end of base 12 is formed an upright receptacle 28 externally threaded at 30 near its upper end so as to mate with a cover 32 at least the uppermost top portion 34 of which is transparent. Mounted within receptacle 28 is a water filter cartridge 36.

In base 10 beneath catridge 36 is an outlet channel 38 (see FIG. 4). Within the interior of base 12 is a lateral channel 40 which leads from inlet opening 14 past a valve 42 to a hollow boss 43 that communicates with an inlet 44 of cartridge 36. Valve 42 is operated by an external manually-adjustable handle 45, and the valve protrudes within channel 40 so as to be disposed between inlet opening 14 and outlet opening 26. A smooth-walled cap 45a snaps in place over handle 45. Formed laterally through valve 42 is a cutout 46 surrounded by a saddle shaped O-ring 48, and the valve is sealed within channel 40 by another O-ring 50. On one side of valve 42 is a longitudinal slot 52 which, when aligned with the port 54 of inlet opening 14, allows water to flow longitudinally of channel 40 toward opening 43 beneath the inlet 44 of cartridge 36. When, however, handle 45 is turned to the position shown in FIG. 3, cutout 46 is aligned between inlet opening 14 and outlet opening 26, so that unfiltered water is permitted to flow directly from inlet opening 14 to outlet opening 26 for dispensing directly toward the sink. Valve 42 is essentially described in the aforesaid U.S. Pat. No. 4,172,796 and operates the same way as in that patent. At various places in the drawings, water flow paths are generally indicated with solid arrows, while air flow paths are indicated with dash-dot arrows.

As best seen in FIGS. 1 and 3, base 12 is, primarily for aesthetic purposes, enveloped within the combination of an upper cover 56 and a lower cover 58 each of which has its own openings to accomodate the different inlets and outlets. Moreover, the portion of cover 58 beneath outlet 38 is formed to define an aerator retainer or housing 60.

Retainer 60 envelopes the lower end of a snout 62 projecting downwardly from base 12 and integrally within which is molded a distributor 64 beneath which is a stainless-steel filter screen 66 seated into place within retainer 60 (see FIG. 4). Water from channel 38 courses through ductwork within the interior of distributor 64 by way of an illustrated circumferentially-spaced series of lateral ducts 68 for delivery through the pores of screen 66. Alternatively, screen 66 may be molded into or be formed as an integral part of retainer 60. Air is inletted through gaps between covers 56 and 58 about base 12 for entrainment with the water flowing laterally from ducts 68. That is, covers 56 and 58 do not fit base 12 tightly, especially around the stem of valve 42 that leads to handle 45, and an air gap exists between lower cover 58 and the bottom of snout 62.

Fitted onto outlet 26 is another aerator 74 which includes an integrated or one-piece internal distributor 76, with ductwork and air passageways. A stainless-steel screen 78 is disposed in the bottom of a retainer 80. Distributor 76 includes a peripheral series of ducts that lead into a space beneath the distributor proper and within a downwardly-depending and outwardly-spaced skirt 82. A circumferentially-spaced series of lugs 83 formed around skirt 82 position distributor 76 within retainer 80 and secure screen 78 against an inturned lip 84 at the lower end of that retainer. Lip 84 includes a circumferentially-spaced series of windows 85 that permit air to enter and flow to ports 86 formed between lugs 83 and enter-laterally into entrainment internally of the distributor with the water flowing out of the ducts as shown and within skirt 82. Here again, an alternative is to mold screen 78 as an integral part of distributor 74. One common feature of both aerators is that the distributing parts constitute but a single molded piece.

Cartridge 36 has a configuration enabling it to be used in any of the apparatus described in the prior patents mentioned in the introduction hereto and belonging to applicant's assignee. Thus, it has a shell 90 upon the opposing ends of which are one end wall 92 and another end wall 94. Inwardly formed collets 96 and 98 define what in this application are inlet and outlet openings and seat upon bosses 43 and 99 projecting upwardly from base 12. However, the terms "inlet" and "outlet" are not necessarily, in all applications, aptly descriptive as will be observed by reference to the patents of applicant's assignee mentioned in the introduction wherein alternative flow modes are disclosed for cartridges of the same general configuration. Thus, and as will be discussed below in more detail, the description herein of particular flow path directions is to be understood possibly to be reversable when the very same or a similar cartridge is used in some other kind of appliance, including a faucet-attachment unit generally the same as herein disclosed but with reversal as between the inlet and outlet of water flow to and from the cartridge.

A conduit 100 is disposed to project through a filtration material 102, such as activated carbon, and leads from inlet opening 44, formed by its bottom end secured within collet 96 in end wall 94, to a second opening 104 in end wall 92. Cartridge 36 is captivated into place by cover 32 which is engaged against an elastomeric sealing ring 106, and in which cover is defined a space 108 which permits water emerging from opening 104 to pass through a porous filter 110 exteriorly disposed on end wall 92. Disposed in end wall 92 beneath filter 110 is a circumferentially-spaced series of apertures 112 that communicates the water to filtration material 102. That is, filter 110 in this implementation serves as a pre-filter and apertures 112 together constitute a third opening of cartridge 36. A fourth opening 114 formed by collet 98 in end wall 94 completes the flow path through material 102.

A hollow cylindrically-shaped filter element 120, closed at its upper end, has its open lower end disposed to face end wall 94 and is captivated in place within a cap-shaped deflector 122 which has circumferentially-spaced interior ribs 123 that create a passageway 124 from near end wall 94 and alongside the exterior side wall of filter 120. Of course, filter element 120 may be polygonal in shape in which case its effect would be substantially the same, but cylindrical appears to be the most efficient shape in terms of cost and performance. As specifically embodied, filter 120 sits inside three circumferentially-shaped legs 125a which project upwardly from a ring 125b that seats within collet 98. Deflector cap 122 fits on the outside of legs 125a and has a lower skirt spaced outwardly from collet 98 to define the first portion of passageway 124. Internally projecting barbs 125c captivate filter 120.

While the distribution of apertures 112 tends to begin a flow path of the water, in this case, in a spread across the main filtration material, the water naturally would otherwise seek the path of least resistance and channel itself directly to what herein becomes post-filter 120. Deflector 122 spoils that flow path and forces the water to flow outwardly around the deflector and thereby engage and be spread more widely throughout a greater portion of the primary filtration material 102 and only laterally enter into post-filter 120 by means of a flow path around the open lower end of deflector cap 122 and into passageway 124.

As manufactured, what in this case is pre-filter 110 is white in color. During continued usage of the filter, the entrapment of particulates will effect a change from white to a gradually darkening color. Also disposed on the exterior of cartridge cover 92 is what in this case is a white-colored circular band 126 which serves as a reference color. Thus, the user may observe the contrast and compare between the color of filter 110 and that of band 126 in order to detect when the contrast in color is so sharp that it is time to replace the cartridge. In an alternative, sealing ring 106 may be made of a white-colored elastomer, so as to serve the purpose of band 126.

Disposed on the underside or interior of end vall 92 and in a position overlying and covering apertures 112 is a porous cloth 130. Its primary purpose is to serve, during manufacture, to prevent blow-by of the carbon material during manufacture. The entire approach is designed to facilitate complete automation in manufacturing. One additional advantage of what in this case is post-filter 120 is that it lends itself well to automatic assembly as contrasted with felt-like filters employed in prior cartridges of this same general arrangement.

Filter 110 is a porous polymer formulated specifically to act as depth filter. It desirably exhibits a porosity of approximately between one and two thousandths of an inch. Filter 120, at the other end of the material, similarly is a porous polymer and is formulated to prevent carbon fines from entering the outlet of the present appliance as well as to accomplish a final particulate filtering of the exiting water. It preferably exhibits a pore size of between four and six thousandths of an inch or approximately five thousandths of an inch.

The unit described offers all of the advantages of the faucet-type water filters and of the cartridges presented in the predecessor patents mentioned in the introduction. In the overall, one major improvement is cost efficiency during manufacture. For example, reversable adaptor 16 decreases the number of adaptors which need to be included within the package sold to consumers, the aerators have been substantially simplified as compared with those which are common on the marketplace and the cartridge is improved in respects which better permit automation of the manufacturing operations. To better facilitate such automation, the upper ends 43a and 99a of bosses 43 and 99 captivate the respective O-rings as shown in the drawings, and desirably are in the form of inserts each provided with barbs 125c on a shank that, on assembly, becomes locked within the respective channel.

Within the cartridge itself, there appears to be what is a better flow path of the water in the sense of maximizing the utilization of the main filtration material, and the positioning of what in this case is pre-filter 110 on the exterior of the top of the cartridge enables a color reference to be used for the purpose of determining the need for cartridge replacement in a given unit. At the same time, the faucet-attachment filter unit is so constructed as to accept older forms of such cartridges, and the new cartridge is so structured as to be substituted for the older kinds of cartridges in a variety of different units already in the hands of users.

It has been mentioned above that the filter cartridge may be used with other appliances and operate in different modes of water flow. When flow is in the reverse direction through filter material 102, it may be necessary to secure deflector 122 more firmly in place as by snap fitting or sonic welding. In such a reverse mode of operation, of course, what is here pre-filter 110 may no longer serve as a comparative indicator of accumulative usage, and performance may not be as good as with the flow mode specifically shown.

While a paricular embodiment of the present invention has been shown and described, and various alternatives and modifications have been disclosed, it will be obvious to those skilled in the art that changes and modifications may be made without departing from the invention in its broader aspects. Therefore, the aim in the appended claims is to cover all such changes and modications as fall within the true spirit and scope of that which is patentable.

I claim:

1. A faucet-attachment water filter comprising:
   an elongated base having an inlet opening near one end thereof;
   an adaptor ring secured to said inlet opening for attachment to a water faucet;
   a first outlet opening on said base generally opposite said inlet opening;
   a channel defined within said base and leading toward the other end thereof;
   an externally-operable valve disposed within said base for selecting between flow from said inlet to one or the other of said first outlet and said channel;
   means located near the other end of said base for mounting a water filter cartridge in a manner to communicate with said channel for delivering water from said channel to said cartridge;
   a second outlet near said other end of said base for dispensing water delivered from said cartridge;
   a water filter cartridge disposed on said mounting means and having an exteriorly-located exposed filter element that exhibits a given color upon the beginning of usage but which changes color with continued usage in response to entrapment of matter in said water, and further having a reference color exhibited on the exterior of said cartridge in a position to enable a user to compare said given and reference colors;
   and a housing removably secured to said base in confinement of said cartridge.

2. A water filter as defined in claim 1 in which said housing includes a transparent area enabling visual observation and comparison of said colors.

3. A faucet-attachment water filter comprising:

an elongated base having an inlet opening near one end thereof;

an adaptor ring reversibly secured to said inlet opening for attachment to a water faucet, said ring having exteriorally-facing threads on one end portion for threadably mating to one type of water faucet and interiorally-facing threads on its other end portion for threadably mating to a different type of water faucet;

a first outlet opening on said base generally opposite said inlet opening;

a channel defined within said base and leading toward the other end thereof;

an externally-operable valve disposed within said base for selecting between flow from said inlet to one or the other of said first outlet and said channel;

means located near the other end of said base for mounting a water-filter cartridge in a manner to communicate with said channel for delivering water from said channel to said cartridge;

a second outlet near said other end of said base for dispensing water delivered from said cartridge;

a water filter cartridge disposed on said mounting means;

and a housing removably secured to said base and which confines said cartridge.

4. A faucet-attachment water filter comprising:

an elongated base having an inlet opening near one end thereof;

means secured to said inlet opening for attachment to a water faucet;

a first outlet opening on said base generally opposite said inlet opening;

a channel defined within said base and leading toward the other end thereof;

an externally-operable valve disposed within said base for selecting between flow from said inlet to one or the other of said first outlet and said channel;

means located near the other end of said base for mounting a water-filter cartridge in a manner to communicate with said channel for delivering water from said channel to said cartridge;

a second outlet near said other end of said base for dispensing water delivered from said cartridge;

an aerator disposed in association with at least one of said first and second outlet openings, said aerator including:

a housing;

a one-piece molded distributor integrally projecting downward from said base and disposed within said housing;

means defining an air gap for inletting air between said housing and said distributor;

means defining a series of circumferentially-spaced lateral ducts formed in said distributor;

and means for receiving water from said one outlet into the interior of said distributor for passage through and into entrainment with air inletted through said air gap.

5. A faucet-attachment water filter as defined in claim 4 which includes a cover enveloping said base and in which said cover includes means defining said housing.

6. An aerator assembly comprising:

a water dispenser including an element through which an outlet opening is defined;

a housing;

a one-piece molded distributor integrally projecting downward from said element and disposed within said housing;

means defining an air gap for inletting air between said housing and said distributor;

means defining a series of circumferencially-spaced lateral ducts formed in said distributor;

and means for receiving water from said outlet into the interior of said distributor for passage through and into entrainment with air inletted through said air gap.

7. A dispenser as defined in claim 6 which includes a cover enveloping said element and in which said cover includes means defining said housing.

* * * * *